United States Patent [19]

Mori et al.

[11] Patent Number: 5,159,010
[45] Date of Patent: Oct. 27, 1992

[54] ADHESIVE COMPOSITIONS FOR ADHERING ORGANIC SYNTHETIC FIBERS TO NITRILE GROUP-CONTAINING HIGHLY SATURATED COPOLYMER RUBBERS, METHOD FOR TREATING ORGANIC SYNTHETIC FIBERS USING SAME, AND METHOD FOR ADHERING ORGANIC SYNTHETIC FIBERS TO RUBBERS USING SAME

[75] Inventors: Osamu Mori, Kamakura; Hiroshi Hisaki; Motofumi Oyama, both of Yokosuka; Kiyomori Ohura, Ohta, all of Japan

[73] Assignee: Zeon Co., Ltd., Tokyo, Japan

[21] Appl. No.: 618,969

[22] Filed: Nov. 28, 1990

[30] Foreign Application Priority Data

Nov. 28, 1989 [JP] Japan .................. 1-308082

[51] Int. Cl.$^5$ .................. C08K 3/20; C08F 8/04; C08F 236/12; C08G 8/30
[52] U.S. Cl. .................. 524/510; 525/329.3; 525/338; 525/502
[58] Field of Search .................. 524/510; 525/338

[56] References Cited

U.S. PATENT DOCUMENTS

| 3,814,713 | 6/1974 | Honda et al. | 524/510 |
| 4,892,928 | 1/1990 | Hoxmeier | 525/338 |
| 4,956,417 | 9/1990 | Hayashi et al. | 525/327.7 |

Primary Examiner—Joseph L. Schofer
Assistant Examiner—Wu C. Cheng
Attorney, Agent, or Firm—Sherman and Shalloway

[57] ABSTRACT

An adhesive composition for adhering an organic synthetic fiber to a nitrile group-containing highly saturated copolymer rubber, said composition comprising a nitrile group-containing highly saturated copolymer rubber latex having an iodine value of not more than 120 and a resorcinol-formaldehyde resin, characterized in that the nitrile group-containing highly saturated copolymer rubber latex is obtained by treating a nitrile group-containing unsaturated copolymer rubber latex resulting from emulsion polymerization with hydrogen in the presence of a hydrogenation catalyst to selectively hydrogenate a carbon-carbon double bond of the nitrile group-containing unsaturated copolymer constituting said latex.

14 Claims, No Drawings

ADHESIVE COMPOSITIONS FOR ADHERING ORGANIC SYNTHETIC FIBERS TO NITRILE GROUP-CONTAINING HIGHLY SATURATED COPOLYMER RUBBERS, METHOD FOR TREATING ORGANIC SYNTHETIC FIBERS USING SAME, AND METHOD FOR ADHERING ORGANIC SYNTHETIC FIBERS TO RUBBERS USING SAME

This invention relates to an adhesive composition for adhering an organic synthetic fiber to a nitrile group-containing highly saturated copolymer rubber, a method for treating the organic synthetic fiber using said adhesive composition, and a method for adhering the organic synthetic fiber to the nitrile group-containing highly saturated copolymer rubber using said adhesive composition.

Composite products of fibers and rubbers have been used in automobile timing belts, polyribbed belts, conveyor belts, hoses, diaphragms, etc. On this occasion, an oil resistant acrylonitrile-butadiene copolymer rubber has been hitherto employed. However, with control of automobile exhaust gases, miniatuarization of an engine room for lightweight automobile, closing of the engine room for prevention of noise, etc., oil resistance and heat resistance have been required of rubbers. Accordingly, nitrile group-containing highly saturated copolymer rubbers having heat resistance and oil resistance have been lately widely adopted in the above usages. As a result, adhesives for well adhering the fibers to the nitrile group-containing highly saturated polymer rubbers have been demanded.

The present inventors proposed an adhesive composition for adhering an organic fiber to a nitrile group-containing highly saturated copolymer rubber, wherein a nitrile group-containing highly saturated copolymer rubber latex is used as one component (EP 285094). Their further investigations revealed that when using a latex obtained by phase inversion from an organic solvent solution of a nitrile group-containing highly saturated copolymer rubber resulting from hydrogenation of an alpha,beta-ethylenically unsaturated nitrile-conjugated diene copolymer rubber, adhesion (initial adhesion) in producing a belt molded article and adhesion (heat-resistant adhesion) after using it at high temperatures are at satisfactory levels but adhesion (water-resistant adhesion) after dipping it in hot water is not enough.

Accordingly, it is an object of this invention to provide an adhesive composition for adhering an organic fiber to a nitrile group-containing highly saturated copolymer rubber and excellent in initial adhesion, heat-resistant adhesion and water-resistant adhesion.

Another object of this invention is to provide a method for treating the fiber with said adhesive composition.

Still another object of this invention is to provide a method for adhering the organic synthetic fiber to the nitrile group-containing highly saturated copolymer rubber.

The present inventors have made extensive studies to achieve these objects, and consequently found that when using a nitrile group-containing highly saturated copolymer rubber latex obtained by hydrogenating a nitrile group-containing unsaturated copolymer rubber via a specific method, said water-resistant adhesion improves. This finding has led to completion of this invention.

Thus, in accordance with this invention, there are provided an adhesive composition for adhering an organic synthetic fiber to a nitrile group-containing highly saturated copolymer rubber, said composition comprising a nitrile group-containing highly saturated copolymer rubber latex having an iodine value of not more than 120 and a resorcinol-formaldehyde resin, characterized in that the nitrile group-containing highly saturated copolymer rubber latex is obtained by treating a nitrile group-containing unsaturated copolymer rubber latex resulting from emulsion polymerization with hydrogen in the presence of a hydrogenation catalyst to selectively hydrogenate a carbon-carbon double bond of the nitrile group-containing unsaturated copolymer constituting said latex; a method for treating the organic synthetic fiber characterized by using the adhesive composition; and a method for bonding the organic synthetic fiber to the nitrile group-containing highly saturated copolymer rubber by vulcanization characterized by treating the organic synthetic fiber with the adhesive composition.

The nitrile group-containing unsaturated copolymer rubber latex used in this invention is a latex of a copolymer rubber comprising a conjugated diene and an alpha,beta-ethylenically unsaturated nitrile and if required, an ethylenically unsaturated monomer as a third component, said latex being obtained by emulsion-copolymerizing these monomers.

In the copolymer rubber, the proportions of the individual monomers are usually 30 to 90% by weight of the conjugated diene unit, 10 to 50% by weight of the alpha,beta-ethylenically unsaturated nitrile unit and 0 to 20% by weight of the ethylenically unsaturated monomer unit.

The molecular weight of the copolymer rubber is not limited in particular.

The alpha,beta-ethylenically unsaturated nitrile may be any nitrile if containing a nitrile group and a polymerizable unsaturated bond. Concrete examples thereof are acrylonitrile and methacrylonitrile.

The conjugated diene is not limited in particular either. Concrete examples thereof are aliphatic conjugated dienes such as 1,3-butadiene, isoprene, 2,3-dimethyl-1,3-butadiene, 1,3-pentadiene, and halosubstituted butadiene. These conjugated dienes may be used either singly or in combination.

The ethylenically unsaturated monomer used as the third component may be any monomer if emulsion-copolymerizable with the conjugated diene and the alpha,beta-ethylenically unsaturated nitrile. Concrete examples thereof are unsaturated carboxylic acids such as acrylic acid, methacrylic acid, itaconic acid and maleic acid and their salts; unsaturated carboxylic acid esters such as methyl (meth)acrylate, ethyl (meth)acrylate, butyl (meth)acrylate, 2-ethylhexyl (meth)acrylate, trifluoroethyl (meth)acrylate, tetrafluoropropyl (meth)acrylate, ethyl itaconate, butyl fumarate, butyl maleate, methoxymethyl (meth)acrylate, ethoxyethyl (meth)acrylate, methoxyethoxyethyl (meth)acrylate, cyanomethyl (meth)acrylate, 2-cyanoethyl (meth)acrylate, 1-cyanopropyl (meth)acrylate, 2-ethyl-6-cyanohexyl (meth)acrylate, 3-cyanopropyl (meth)acrylate, hydroxyethyl (meth)acrylate and hydroxypropyl (meth)acrylate; (meth)acrylamide and its N-substituted derivatives such as N-methylol (meth)acrylamide, N,N-dimethylol (meth)acrylamide and N-ethoxymethyl (meth)acrylamide; fluoroalkylvinyl ethers such as fluoroethylvinyl ether; and vinylpyridine. Moreover, a copolymerizable antioxidant and a non-conjugated diene are also included in the ethylenically unsaturated monomer of this invention. Concrete examples of the copolymerizable antioxidant are N-(4-anilinophenyl)(meth)acrylamide, N-(4-anilinophenyl)cinnamamide, N-(4-anilinophenyl)crotonamide, N-(4-anilinophenyl)amino-2-hydroxypropyl(meth)allyl ether, 5-N-(4-anilinophenyl)amino-2-hydroxypentyl (meth)acrylate, 2-N-(4-anilinophenyl)aminoethyl (meth)acrylate, N-[4-(methylanilino)phenyl](meth)acrylamide, N-(4-anilinophenyl)maleimide, N-[4-(methylanilino)phenyl]maleimide, N-phenyl-4-(3-vinylbenzyloxy)aniline, and N-phenyl-4-(4-vinylbenzyloxy)aniline. Concrete examples of the non-conjugated diene are vinyl norbornene, dicyclopentadiene, and 1,4-hexadiene.

Concrete examples of such nitrile group-containing unsaturated copolymer rubber are a butadiene-acrylonitrile copolymer rubber, an isoprene-butadiene-acrylonitrile copolymer rubber, an isoprene-acrylonitrile copolymer rubber, a butadiene-methyl acrylate-acrylonitrile copolymer rubber, a butadiene-acrylic acid-acrylonitrile copolymer rubber, and a butadiene-ethylene-acrylonitrile copolymer rubber.

In this invention, a method for emulsion-polymerizing the above monomers may be a usual method such as a batchwise method, a semi-batchwise method or a continuous method, and a polymerization temperature and a polymerization pressure are not particularly limited either.

The emulsifying agent used in polymerization is not particularly limited either and may be an anionic surface active agent, a cationic surface active agent, a nonionic surface active agent or an ampholytic surface active agent. Of these, the anionic surface active agent is preferable. Aliphatic acid series are especially preferable. The amount of the emulsifying agent is not limited in particular. From the aspect of adhesion of the adhesive composition obtained from this latex, it is 1 to 10% by weight, preferably 2 to 6% by weight based on the total weight of all the monomers.

A polymerization initiator, a molecular weight modifier and other polymerization aids may, if necessary, be those commonly used.

Moreover, the latex obtained by polymerization may contain an antioxidant and a pH adjustor if required.

The nitrile group-containing highly saturated copolymer rubber latex used in this invention is formed by treating a nitrile group-containing unsaturated copolymer rubber latex resulting from emulsion polymerization with hydrogen in the presence of a hydrogenation catalyst to selectively hydrogenate a carbon-carbon double bond of the nitrile group-containing unsaturated copolymer constituting the latex.

The treatment with hydrogen (hydrogenation reaction) of the latex is carried out by encapsulating the latex, a hydrogenation catalyst and hydrogen in a pressure-resistant vessel, preferably with stirring. The sequence of adding them is not limited in particular It is however advisable in operation to encapsulate the latex first and hydrogen last.

The concentration of the latex subjected to the hydrogenation reaction is not limited in particular; not more than 20% by weight (as a solids content) is preferable. When it exceeds 20% by weight, there is a tendency that the average particle size of the latex increases and a coagulum occurs.

In hydrogenation, stability of the latex resulting from emulsion polymerization can also be improved by post-adding a surface active agent to said latex. At this time, the surface active agent can be the same as those taken above as the emulsifying agent for polymerization. It is advisable that the amount of the surface active agent is not more than 4% based on the weight of the copolymer in order not to decrease the adhesion characteristics of the final adhesive composition.

The hydrogenation catalyst used in this invention is a palladium compound that is hard to decompose with water and it is not limited in particular. Concrete examples of the palladium compound are various organic compounds, inorganic compounds and complex salts, for example, palladium salts of carboxylic acids such as formic acid, acetic acid, propionic acid, lauric acid, succinic acid, stearic acid, oleic acid, phthalic acid and benzoic acid; chlorinated palladium compounds such as palladium chloride, dichloro(cyclooctadiene)palladium, dichloro(norbornadiene)palladium, dichloro(benzonitrile)palladium, dichlorobis(triphenylphosphine)palladium, ammonium tetrachloropalladate (II), and ammonium hexachloropalladate (IV); brominated palladium compounds such as palladium bromide; iodized palladium compounds such as palladium iodide; and palladium sulfate dihydrate; and potassium tetracyanopalladate (II) trihydrate. Of these, the palladium salts of carboxylic acids, dichloro(norbornadiene)palladium and ammonium hexachloropalladate are most preferable.

The amount of the hydrogenation catalyst may properly be determined from the type of the copolymer being hydrogenated and the intended hydrogenation degree It is usually 5 to 6,000 ppm, preferably 10 to 4,000 ppm based on the weight of the nitrile group-containing unsaturated copolymer. It can be more than 6,000 which is however uneconomical.

A method for adding the hydrogenation catalyst is not limited in particular. It may be added in the solid state as such or in the state dispersed in water or latex. When the hydrogenation catalyst is dissolved in an organic solvent, the organic solvent solution of the hydrogenation catalyst is added to the latex of the nitrile group-containing unsaturated copolymer which is advisable in efficiency of the hydrogenation reaction and operation.

In this invention, the hydrogenation reaction can be performed with good efficiency by adding to the reaction system an organic solvent that can dissolve or swell the nitrile group-containing unsaturated copolymer. This is presumably because the nitrile group-containing unsaturated copolymer constituting the latex is swelled with the organic solvent, making it easy for the hydrogenation catalyst to approach the carbon-carbon double bond of the copolymer.

Concrete examples of the organic solvent are aromatic hydrocarbons such as benzene, toluene, xylene, and ethylbenzene; halogenated hydrocarbons such as dichloroethane, chloroform, chlorobenzene, and carbon tetrachloride; ketones such as methyl ethyl ketone, acetone, cyclohexanone, and cyclopentanone; carboxylic acid esters such as methyl acetate, ethyl acetate, propyl acetate, and butyl acetate; alcohols having 6 or more carbon atoms, such as diacetone alcohol and benzyl alcohol; ethers such as dioxane, tetrahydrofurane, and ethyl ether; and nitriles such as acetonitrile, acrylonitrile and propionitrile. Of these, the ketones and the carboxylic acid esters are preferable. They may be used either singly or in combination.

The amount of the organic solvent is at most thrice, preferably at most 1.5 times, more preferably at most the same as but at least 0.05 time, that of the latex by volume ratio. Though the hydrogenation reaction proceeds with the organic solvent in an amount exceeding thrice that of the latex, the emulsion is liable to be destroyed and separated into a solvent phase and an aqueous phase. Accordingly, new steps of separating these two phases and recovering the hydrogenated polymer from the solvent phase are needed. Within the range of thrice to 1.5 times, the hydrogenation reaction can be run while keeping the emulsion state, but the latex particle size sometimes increases during the reaction, destroying the emulsion after the reaction.

The organic solvent may be added before, after or simultaneously with, the addition of the hydrogenation catalyst.

The hydrogenation reaction temperature is 0° to 300° C., preferably 20° to 150° C. The hydrogenation reaction can be carried out at a temperature higher than 300° C. which is however liable to cause side reactions other than the intended selective hydrogenation reaction of the carbon-carbon double bond, such as hydrogenation of the organic solvent, hydrogenation of the nitrile group, etc.

The hydrogen source of the hydrogenation reaction is a gaseous hydrogen or dissolved hydrogen. Contact of hydrogen with the carbon-carbon double bond of the nitrile group-containing unsaturated copolymer can readily be achieved by stirring the reaction system.

The hydrogen pressure is atmospheric pressure to 300 $kg/cm^2$, preferably 5 to 200 $kg/cm^2$, more preferably 10 to 80 $kg/cm^2$. It may be a high pressure of more than 300 $kg/cm^2$ which results unpractically in high cost of equipment and cumbersome handling.

The hydrogenation degree (i.e. the iodine value of the nitrile group-containing copolymer) may be controlled by any means and usually by varying the hydrogenation pressure and the reaction time depending on the intended hydrogenation degree (iodine value).

After the hydrogenation reaction is over, excess hydrogen is released outside the system, and the hydrogenation catalyst is removed. The removal of the hydrogenation catalyst is conducted such that an activated carbon is added to the reaction system and adsorbes the hydrogenation catalyst which is then removed via centrifugation, filtration, etc. An ion exchange resin may replace the activated carbon. Sometimes, the nitrile group-containing highly saturated copolymer latex obtained by hydrogenation can be used in the next step with the hydrogenation catalyst present therein (without removal of said catalyst therefrom).

When using the solvent, said solvent is removed by a known method such as steam stripping.

The thus obtained nitrile group-containing highly saturated copolymer rubber latex is concentrated to an intended concentration depending on the usage by an ordinary method such as a rotary evaporator, a high-speed centrifugal separator, etc.

The nitrile group-containing highly saturated copolymer rubber latex used in this invention is, as stated above, obtained from the nitrile group-containing unsaturated copolymer rubber latex, and the iodine value of the nitrile group-containing highly saturated copolymer rubber has to be not more than 120. When it exceeds 120, heat-resistant adhesion of the obtained adhesive composition undesirously decreases.

The adhesive composition for bonding the organic synthetic fiber to the nitrile group-containing highly saturated copolymer rubber vulcanization in this invention comprises the above nitrile group-containing highly saturated copolymer rubber latex and the resorsinol-formaldehyde resin as essential components.

The resorsinol-formaldehyde resin is not limited in particular and known resins (resins shown in e.g. Japanese Laid-open Patent Application No. 142635/80) are available. Moreover, 2,6-bis(2,4-dihydroxyphenylmethyl)-4-chlorophenol or its similar compounds, isocyanates, blocked isocyanates, ethylene urea, polyepoxide, modified polyvinyl chloride resins can be conjointly used which have been so far employed to increase adhesion.

In the adhesive composition of this invention, the amount (dry weight) of the resorcinol-formaldehyde resin is usually 10 to 180 parts by weight per 100 parts by weight (as a solids content) of the nitrile group-containing highly saturated copolymer rubber latex.

By the way, part of the nitrile group-containing highly saturated copolymer rubber latex can be replaced with a styrene-butadiene copolymer rubber latex, its carboxyl-modified latex, an acrylonitrile-butadiene copolymer rubber latex, its carboxyl-modified latex or a natural rubber latex unless impairing the scope of this invention.

The adhesive composition of this invention can be properly used to treat organic synthetic fibers.

The organic synthetic fibers available in this invention are not limited in particular. Examples thereof are polyvinyl alcohol fibers, polyester fibers, polyamide fibers, and aramide fibers (aromatic polyamide fibers).

These fibers can take the form of staples, filaments, cord, rope or canvas. Other forms are also available.

A method for treating the fibers with the adhesive composition of this invention is not particularly limited. The same method as employed in using the known resolcinol-formaldehyde resin-polymer latex adhesive composition is available. For example, the fibers are dipped with the adhesive composition and if required, dried usually at 100° to 150° C. for 0.5 to 10 minutes, and then heat-treated. The heating conditions are not particularly limited; the time and the temperatures are those enough to react and fix the adhesive composition adhered by dipping. Heating is carried out usually at about 140° to about 250° C. for several minutes. Incidentally, previous to the dipping treatment of the fibers, it is also possible to dip the fibers in an isocyanate solution, an epoxy solution or a mixed solution thereof and dry them.

In this invention, the amount adhered (as a solids content) of the adhesive composition is not particularly limited. It is usually 2 to 20% by weight, preferably 3 to 10% by weight based on the fibers.

The adhesive composition of this invention is effectively used for bonding the organic synthetic fibers to the nitrile group-containing highly saturated copolymer rubber by vulcanization, thereby providing a composite product of the organic synthetic fibers and the nitrile group-containing highly saturated copolymer rubber.

The nitrile group-containing highly saturated copolymer rubber (hereinafter referred to at times as an "adhered rubber") used as a product to which the orgnaic synthetic fibers are adhered in this invention may be a copolymer rubber of an alpha,beta-ethylenically unsaturated nitrile and a conjugated diene and/or an ethylenically unsaturated monomer, or its derivatives. The content of the nitrile group-containing monomer unit in the adhered rubber is usually 10 to 60% by weight from the aspect of oil resistance of the rubber product combined with the fibers. The iodine value is not more than 120, preferably not more than 100, more preferably not more than 80 from the aspect of heat resistance. The adhered rubber can be formed by using the same monomers as employed to form the aforesaid nitrile group-containing unsaturated copolymer rubber latex.

The adhered rubber can be obtained directly as a nitrile group-containing highly saturated copolymer rubber by copolymerization of the above monomers or by hydrogenating the nitrile group-containing unsaturated copolymer rubber. On this occasion, the polymerization method and the hydrogenation method are not limited in particular. Concrete examples of the adhered rubber are a highly saturated butadiene-acrylonitrile copolymer rubber, a highly saturated isoprene-butadiene-acrylonitrile copolymer rubber, a highly saturated isoprene-acrylonitrile copolymer rubber, a highly saturated butadiene-methyl acrylate-acrylonitrile copolymer rubber, a highly saturated butadiene-acrylic acid-acrylonitrile copolymer rubber, a highly saturated butadiene-ethylene-acrylonitrile copolymer rubber, and a butyl acrylate-ethoxyethyl acrylate-vinyl norbornene-acrylonitrile copolymer rubber.

A method for bonding the organic synthetic fibers treated with the adhesive composition of this invention to the nitrile group-containing highly saturated copolymer rubber by vulcanization is not limited in particular. The same method as hitherto employed to bond the fibers to the rubber by vulcanization can be used. That is, it can be achieved by embedding the organic acrylonitrile copolymer rubber, a highly saturated butadiene-methyl acrylate-acrylonitrile copolymer rubber, a highly saturated butadiene-acrylic acid-acrylonitrile copolymer rubber, a highly saturated butadiene-ethylene-acrylonitrile copolymer rubber, and a butyl acrylate-ethoxyethyl acrylate-vinyl norbornene-acrylonitrile copolymer rubber.

A method for bonding the organic synthetic fibers treated with the adhesive composition of this invention to the nitrile group-containing highly saturated copolymer rubber by vulcanization is not limited in particular. The same method as hitherto employed to bond the fibers to the rubber by vulcanization can be used. That is, it can be achieved by embedding the organic synthetic fibers in the rubber blend obtained by adding compounding agents such as a vulcanizing agent, a filler, etc. to a rubber, and then conducting vulcanization. The vulcanization conditions are usually a pressure of 5 to 100 kgf/cm$^2$, a temperature of 120° to 180° C. and a time of 1 to 120 minutes.

In accordance with this invention, there can be obtained the adhesive composition for adhering the organic synthetic fibers to the nitrile group-containing highly saturated copolymer rubber, said composition being excellent in initial adhesion, heat-resistant adhesion and water-resistant adhesion. Since the composite product of the nitrile group-containing highly saturated copolymer rubber and the organic synthetic fibers obtained by using the adhesive composition of this invention is superior to the product obtained by using the conventional adhesive composition in intial adhesion, adhesion after heat ageing (heat-resistant adhesion) and water-resistant adhesion, it is useful to produce various belts such as automobile timing belts and polyribbed belts and various hoses such as pressure hoses and freon hoses, wherein the organic synthetic fibers are used as a tension-resistant material.

The following Examples illustrate this invention more specifically. Parts and percents in said Examples are by weight unless otherwise indicated.

REFERENTIAL EXAMPLE 1

(Preparation of a latex by emulsion polymerization)

A 1000-milliliter pressure-resistant bottle was charged with 240 g of water, 4 g of potassium oleate, and 37 g of acrylonitrile in this sequence. After the inside of the bottle was purged with a nitrogen gas, 63 g of butadiene was forced therein. The bottle was put in a constant temperature bath, and 0.25 g of ammonium persulfate was added as a catalyst, followed by polymerization for 16 hours. There resulted a latex A-5 of an acrylonitrile-butadiene copolymer rubber (hereinafter abbreviated as "NBR") containing 37% by weight of bound acrylonitrile.

Subsequently, the latex was adjusted to a solids content of 12%, and 400 ml of the latex was charged in a 1 liter autoclave fitted with a stirrer. A nitrogen gas was passed for 10 minutes to remove oxygen present in the latex, and palladium acetate as a hydrogenation catalyst was dissolved in 240 ml of acetone and added. The inside of the system was replaced twice with a hydrogen gas, and pressured with a hydrogen gas until the pressure inside the system reached 30 atm. The contents were then heated to 50° C., and reacted for 6 hours under stirring. After the contents were cooled to room temperature, excess hydrogen was purged, and the organic solvent was removed via an evaporator. The resulting latex was concentrated to a solids content of about 40% to afford a highly saturated NBR latex A-1 having an iodine value of 108.

Highly saturated NBR latexes A-2 and A-3 having different iodine values and a NBR latex A-4 having a high degree of unsaturation were obtained in the same manner as above except changing the hydrogenation conditions (a reaction time and/or an amount of the catalyst). The pH, the average particle size and the iodine value of these latexes are shown in Table 1.

TABLE 1

| Latex | A-1 | A-2 | A-3 | A-4 | A-5 |
|---|---|---|---|---|---|
| Iodine value | 108 | 42 | 21 | 142 | 308 |
| Average particle size (μ) | 0.11 | 0.10 | 0.11 | 0.10 | 0.09 |
| Solids content (%) | 40.2 | 40.1 | 40.1 | 40.0 | 39.8 |
| pH | 10.6 | 10.7 | 10.6 | 10.5 | 11.0 |

REFERENTIAL EXAMPLE 2

(Preparation of a latex by phase inversion).

A NBR latex containing 37% of bound acrylonitrile, which was obtained by emulsion polymerization in the same way as above, was coagulated in a usual manner. The obtained NBR was dissolved in methyl isobutyl ketone, and the butadiene portion of NBR was hydrogenated in the presence of a palladium-carbon catalyst to form hydrogenated NBR having an iodine value of 80. Sixty grams of the hydrogenated NBR was dissolved in 540 g of a solvent mixture of methyl ethyl ketone/cyclohexane (50/50% by volume). To the resulting solution were added 32 g of a 15% potassium oleate aqueous solution adjusted to pH of 11.5 by potassium hydroxide and 600 g of water under stirring with a homomixer (Model M: a tradename for a machine of Tokushu Kika Kogyo K.K.). Subsequently, the mixture was stirred at 12,000 rpm and emulsified. The solvent was removed from the resulting emulsion by steam stripping and then concentrated via an evaporator to obtain a latex having a solids content of about 30%. Further, the latex was subjected to centrifugation at 10,000 rpm at room temperature for 16 minutes with a centrifugal separator (Type H 251: a tradename for a product of Kokusan Enshinki K.K.) to obtain a latex B-1 having a solids content of 40%. In the same way as above, a latex B-2 having a solids content of about 40% was obtained from hydrogenated NBR having an iodine value of 28. Properties of the resulting latexes are shown in Table 2.

TABLE 2

| Latex | B-1 | B-2 |
| --- | --- | --- |
| Iodine value | 80 | 28 |
| Average particle size (μ) | 0.65 | 0.68 |
| Solids content (%) | 40.0 | 40.1 |
| pH | 10.2 | 10.1 |

REFERENTIAL EXAMPLE 3

(Preparation of an adhered rubber blend)

According to a formulation shown in Table 3, a nitrile group-containing highly saturated copolymer rubber and compounding agents were kneaded on a roll to prepare a sheet of a rubber compound having a thickness of about 2.5 mm.

TABLE 3

| Formulation | a (parts) | b (parts) |
| --- | --- | --- |
| Zetpol 2020 (*1) | 100 | — |
| Zetpol 2000 (*2) | — | 100 |
| Zinc oxide No. 1 | 5 | 5 |
| Stearic acid | 1 | 1 |
| SRF carbon | 40 | 40 |
| Sulfur | 0.5 | — |
| Tetramethylthiuram disulfide | 1.5 | — |
| Mercaptobenzothiazole | 0.5 | — |
| Peroxymon F-40 (*3) | — | 6 |

(*1) A tradename for a product of Nippon Zeon Co., Ltd.: iodine value 28, content of bound acrylonitrile 36%
(*2) A tradename for a product of Nippon Zeon Co., Ltd.: iodine value 4, content of bound acrylonitrile 36%
(*3) A tradename for a product of Nippon Oils and Fats Co., Ltd.; alpha,alpha'-bis-t-butyl peroxide of m,p-diisopropylbenzene

EXAMPLE 1

Adhesive compositions were prepared in accordance with a formulation shown in Table 4 using the latexes shown in Tables 1 and 2.

TABLE 4

|  | parts |
| --- | --- |
| (RF solution) |  |
| Resorcinol | 11.0 |
| Aqueous solution of formaldehyde (37%) | 16.2 |
| Sodium hydroxide (10%) | 3.0 |
| Water | 235.8 |
| Total | 266.0 |
| (RFL solution) |  |
| Latex | 250.0 |
| RF solution | 266.0 |
| Aqueous ammonia (14%) | 22.6 |
| Water | 47.9 |
| Total | 586.5 |

A nylon cord (nylon 6, structure 1,890 d/2) was dipped with the adhesive composition by a single cord dip machine for test, and then heat-treated at 200° C. for 2 hours.

The thus treated cord was embedded in the adhered rubber compound to a length of 8 mm. Vulcanization was conducted at a temperature of 150° C. and a pressure of 50 kgf/cm² in case of the rubber compound (a) and at a temperature of 160° C. and a presure of 5 kgf/cm²for 30 minutes in case of the rubber compound (b) respectively. There resulted composite products of the fibers and rubber.

The resulting composite products were subjected to a cord pulling test according to ASTM D 2138-72 to measure initial adhesion. Likewise, the composite products were heated in an air oven at 120° C. for 168 hours and then subjected to the cord pulling test to measure heat-resistant adhesion. Moreover, the composite products were left to stand in hot water of 50° C. for 72 hours and then measured for water-resistant adhesion. The results are shown in Table 5.

TABLE 5

| | This invention | | | Control | | | | This invention | |
| --- | --- | --- | --- | --- | --- | --- | --- | --- | --- |
| Run No. | 1 | 2 | 3 | 4 | 5 | 6 | 7 | 8 | 9 |
| Latex No. | A-1 | A-2 | A-3 | A-4 | B-1 | B-2 | A-5 | A-2 | A-3 |
| Rubber compound | a | a | a | a | a | a | a | b | b |
| Adhesion (kg/8 mm) | | | | | | | | | |
| Initial Adhesion | 25.0 | 24.2 | 23.8 | 24.5 | 20.9 | 20.2 | 19.8 | 21.2 | 20.9 |
| Heat-resistant adhesion | 21.3 | 22.8 | 22.6 | 19.1 | 19.3 | 19.0 | 13.1 | 19.8 | 19.4 |
| Water-resistant adhesion | 23.6 | 23.1 | 22.8 | 18.2 | 17.6 | 16.9 | 23.2 | 20.1 | 20.0 |

The results in Table 5 reveal that when using the adhesive composition of this invention, there is obtained the composite product of the organic synthetic fibers and the nitrile group-containing highly saturated copolymer rubber, said product being excellent in initial adhesion, heat-resistant adhesion and water-resistant adhesion, whereas when using the adhesive composition prepared from the latex obtained by phase inversion, the resulting composite product is poor in water-resistant adhesion.

EXAMPLE 2

Adhesive compositions were prepared in accordance with a formulation shown in Table 6 using the latexes shown in Tables 1 and 2.

TABLE 6

(Adhesive composition in a first bath)

|  | parts |
|---|---|
| (RF solution) | |
| Resorcinol | 16.6 |
| Aqueous solution of formaldehyde (37%) | 14.7 |
| Sodium hydroxide (10%) | 13.0 |
| Water | 321.7 |
| Total | 366.0 |
| (RFL solution) | |
| Latex | 250.0 |
| RF solution | 366.0 |
| Total | 616.0 |
| (Dipping solution) | |
| RFL solution | 616.0 |
| Vulcabond E (20%) (*1) | 400.0 |
| Total | 1016.0 |

(*1) A tradename for a product of Valnax International Ltd.: 2,2 bis(2,4-dihydroxy-phenylmethyl)-4-chlorophenol composition A polyester cord (structure 1,100 d/2×3) was dipped with the adhesive composition obtained in accordance with the formulation shown in Table 6 by a single cord dip machine for test, and heat-treated at 245° C. for 1 minute. The resulting cord was dipped with the adhesive composition obtained in accordance with the formulation shown in Table 4, and then heat-treated at 245° C. for 1 minute.

From the thus obtained polyester cord, a composite product of fibers and rubber was produced as in Example 1 and subjected to a cord pulling test as in Example 1. The results are shown in Table 7.

From the results shown in Table 7, it follows that when using the polyester fibers, this invention also provides the composite product of the organic synthetic fibers and the nitrile group-containing highly saturated copolymer rubber having excellent water-resistant adhesion.

TABLE 7

| Run No. | This invention 10 | This invention 11 | Control 12 | Control 13 | This invention 14 | This invention 15 | Control 16 |
|---|---|---|---|---|---|---|---|
| Latex No. | A-2 | A-3 | B-2 | A-5 | A-2 | A-3 | B-2 |
| Rubber compound | a | a | a | a | b | b | b |
| Adhesion (kg/8 mm) | | | | | | | |
| Initial Adhesion | 30.7 | 30.1 | 28.4 | 21.4 | 27.3 | 26.7 | 24.1 |
| Heat-resistant adhesion | 25.1 | 24.8 | 23.5 | 16.2 | 22.7 | 22.5 | 21.8 |
| Water-resistant adhesion | 26.9 | 26.2 | 20.1 | 19.7 | 25.3 | 24.9 | 17.8 |

EXAMPLE 3

An aramide cord (Kevlar: a tradename for a ,1 product of E. I. du Pont de Nemours & Co., structure 1,500 d/2) was heat-treated with a pretreating solution shown in Table 8 by a single cord dip machine for test at 220° C. for 1 minute.

TABLE 8

|  | parts |
|---|---|
| Glycerol diglysidyl ether | 2.22 |
| 10% sodium hydroxide | 0.28 |
| 5% AEROSOL" OT (solids content 75%) (*1) | 0.56 |
| Water | 96.94 |
| Total | 100.00 |

(*1) A tradename for a product of American Cyanamid Co.

The resulting cord was further dipped with the adhesive composition obtained in accordance with the formulation shown in Table 4, and then heat-treated at 250° C. for 1 minute. From the thus obtained aramide cord, a composite product of fibers and a rubber was prepared as in Example 1 and subjected to a cord pulling test as in Example 1. The results are shown in Table 9.

TABLE 9

| Run No. | This invention 17 | This invention 18 | Control 19 | Control 20 | This invention 21 | This invention 22 | Control 23 |
|---|---|---|---|---|---|---|---|
| Latex No. | A-2 | A-3 | B-2 | A-5 | A-2 | A-3 | B-2 |
| Rubber compound | a | a | a | a | b | b | b |
| Adhesion (kg/8 mm) | | | | | | | |
| Initial Adhesion | 22.8 | 21.9 | 18.9 | 10.6 | 18.6 | 18.1 | 15.8 |
| Heat-resistant adhesion | 20.9 | 20.1 | 16.5 | 5.8 | 17.3 | 17.0 | 13.9 |
| Water-resistant adhesion | 21.2 | 20.8 | 15.0 | 8.1 | 17.8 | 17.8 | 12.9 |

We claim:

1. An adhesive composition for adhering an organic synthetic fiber to a nitrile group-containing highly saturated copolymer rubber, said composition comprising
   (A) a nitrile group-containing highly saturated copolymer rubber latex having an iodine value of not more than 120 and obtained by hydrogenating with hydrogen in the presence of a hydrogenation catalyst an emulsion polymerized nitrile group-containing unsaturated copolymer rubber latex in the state of latex to selectively hydrogenate a carbon-carbon double bond of the nitrile group-containing unsaturated copolymer constituting said latex, said hydrogenation catalyst being selected from a palladium salt of a carboxylic acid, dichloro (norbornadiene) palladium and ammonium hexachloropalladate, and said hydrogenation being carried out at a temperature of 0° to 300° C. and a hydrogen pressure of atmospheric pressure to 300kg/cm$^2$, and
   (B) a resorcinol-formaldehyde resin.

2. The adhesive composition of claim 1 wherein the nitrile group-containing unsaturated copolymer rubber comprises a conjugated diene unit and an alpha,beta-ethylenically unsaturated nitrile unit.

3. The adhesive composition of claim 1 wherein the nitrile group-containing unsaturated copolymer rubber comprises a conjugated diene unit, an alpha,beta-ethylenically unsaturated nitrile unit and an ethylenically unsaturated monomer unit copolymerizable with them.

4. The adhesive composition of claim 3 wherein the nitrile group-containing unsaturated copolymer rubber comprises 30 to 90% by weight of the conjugated diene unit, 10 to 50% by weight of the alpha,beta-ethylenically unsaturated nitrile unit and 0 to 20% by weight of the ethylenically unsaturated monomer unit copolymerizable with them.

5. The adhesive composition of any one of claims 2 to 4 wherein the conjugated diene is isoprene or butadiene, and the alpha,beta-ethylenically unsaturated nitrile is acrylonitrile or methacrylonitrile.

6. The adhesive composition of claim 1 wherein the nitrile group-containing unsaturated copolymer rubber latex is obtained by emulsion polymerization using an anionic surface active agent as a polymerization emulsifying agent.

7. The adhesive composition of claim 6 wherein the amount of the surface active agent is 1 to 10% by weight based on the total weight of all the monomers.

8. The adhesive composition of claim 1 wherein the nitrile group-containing highly saturated copolymer rubber latex is obtained by treating a nitrile group-containing unsaturated copolymer rubber latex in a solids content of not more than 20% by weight with hydrogen in the presence of a hydrogenation catalyst.

9. The adhesive composition of claim 1 wherein the hydrogenation is performed in the presence of an organic solvent that can dissolve or swell the nitrile group-containing unsaturated copolymer.

10. The adhesive composition of claim 9 wherein the organic solvent is selected from ketones and carboxylic acid esters.

11. The adhesive composition of claim 9 or 10 wherein the amount of the organic solvent is at most thrice that of the latex by volume ratio.

12. The adhesive composition of claim 1 wherein the amount (dry weight) of the resorcinol-formaldehyde resin is 10 to 180 parts by weight per 100 parts by weight (as a solids content) of the nitrile group-containing copolymer latex.

13. An adhesive composition for adhering an organic synthetic fiber to a nitrile group-containing highly saturated copolymer rubber, said composition comprising (A) a nitrile group-containing highly saturated copolymer rubber latex having an iodine value of not more than 120 and obtained by hydrogenating with hydrogen in the presence of a hydrogenation catalyst an emulsion polymerized nitrile group-containing unsaturated copolymer rubber latex in the state of latex to selectively hydrogenate a carbon-carbon double bond of the nitrile group-containing unsaturated copolymer constituting said latex, said rubber comprising 30 to 90% by weight of a conjugated diene unit, 10 to 50% by weight of an alpha, beta-ethylenically unsaturated nitrile unit, and 0 to 20% by weight of an ethylenically unsaturated monomer unit copolymerizable therewith, said hydrogenation catalyst being selected from a palladium salt of a carboxylic acid, dichloro (norbornadiene) palladium and ammonium hexachloropalladate, said hydrogenation being conducted, at a temperature 0° to 300° C. and a hydrogen pressure of atmospheric pressure to 300 kg/cm$^2$, in the presence of an organic solvent which can dissolve or swell the nitrile group-containing unsaturated copolymer, and (B) a resorcinol-formaldehyde resin.

14. The adhesive composition of claim 13, wherein the nitrile group-containing highly unsaturated copolymer rubber latex is obtained by treating a nitrile group-containing unsaturated copolymer rubber latex having a solids content of not more than 20% by weight with hydrogen in the presence of a hydrogenation catalyst at a temperature of 20° to 150° C. and a hydrogen pressure of 5 to 200 kg/cm$^2$.

* * * * *